United States Patent [19]

Fowler et al.

[11] Patent Number: 5,455,918
[45] Date of Patent: Oct. 3, 1995

[54] DATA TRANSFER ACCELERATING APPARATUS AND METHOD

[75] Inventors: Terry Fowler, Mountain View; Kevin McGrath, Hayward; Terry Goode, Sunnyvale; Mark Schneckloth, San Jose, all of Calif.

[73] Assignee: Electronic Arts, Inc., San Mateo, Calif.

[21] Appl. No.: 394,554

[22] Filed: Feb. 27, 1995

Related U.S. Application Data

[63] Continuation of Ser. No. 112,113, Aug. 26, 1993, abandoned.

[51] Int. Cl.$^6$ .................. G06F 3/00; G06F 9/00
[52] U.S. Cl. .................. 395/375; 364/DIG. 1; 364/DIG. 2; 364/260; 364/262.4; 364/262.8; 364/946.2; 364/946.6
[58] Field of Search .......... 364/DIG. 1 MS File, 364/DIG. 2 MS File; 395/200, 400, 425, 375, 800

[56] References Cited

U.S. PATENT DOCUMENTS

| | | | |
|---|---|---|---|
| 4,400,772 | 8/1983 | Broyles et al. | 364/200 |
| 4,439,828 | 3/1984 | Martin | 364/200 |
| 4,700,292 | 10/1987 | Campanini | 364/200 |
| 4,713,750 | 12/1987 | Damouny et al. | 364/200 |
| 4,829,427 | 5/1989 | Green | 364/300 |
| 4,914,584 | 4/1990 | Gibson | 364/200 |
| 5,127,088 | 6/1992 | Takaki | 395/275 |
| 5,226,165 | 7/1993 | Martin | 395/600 |
| 5,307,471 | 4/1994 | Ishikawa | 395/425 |

*Primary Examiner*—Robert B. Harrell
*Attorney, Agent, or Firm*—Phorg K. Truong; Charles E. Gotlieb; Timothy H. Gens

[57] ABSTRACT

In a computing system having a data source, a memory, and a central processing unit (CPU), data is transferred from the data source to the memory by first monitoring signals from the CPU to determine whether data transfer is desired. If data transfer is desired, an optimized instruction set is generated which is specifically designed to cause the CPU to carry out the data transfer in an optimal manner. This optimized instruction set is sent to the CPU and is executed thereby to transfer the data quickly and efficiently. An apparatus for carrying out the above method comprises a determiner, an instruction generator, and a coupling circuit. The determiner monitors address and control signals from the CPU to determine whether data transfer is desired. In response to a determination that data transfer is desired, the determiner generates a run control signal. The instruction generator receives from the data source the data to be transferred and a destination address in the memory in which the data is to be stored, and generates an optimized instruction set using this data and address. The instruction generator sends out this instruction set on its output. The coupling circuit receives the output of the instruction generator and, in response to the run control signal, sends the optimized instruction set to the CPU to allow the CPU to execute the instruction set to transfer data from the data source to the memory.

15 Claims, 5 Drawing Sheets

DATA TRANSFER ACCELERATING APPARATUS AND METHOD

RELATED APPLICATIONS

This is a continuation of application Ser. No. 08/112,113 filed on Aug. 26, 1993, now abandoned.

FIELD OF THE INVENTION

This invention relates generally to computing systems and more particularly to an apparatus and method for accelerating the transfer of data in a computing system from a data source to a memory coupled to a central processing unit.

DESCRIPTION OF THE BACKGROUND ART

In many computing systems, large blocks of data are transferred from a data source, such as a graphics card or a game cartridge, to a data memory on a fairly regular basis. This transfer of data is preferably carried out as quickly as possible to optimize the speed and efficiency of the system. Traditionally, two mechanisms have been employed to effect data transfer. The first mechanism involves the use of a software routine executed by a central processing unit (CPU) to transfer the data from the source to the memory. According to this mechanism, the CPU executes a data transfer loop which moves the data a word at a time from the data source, through the CPU, to the memory until all of the data is transferred. A drawback of this method is that it requires the CPU to generate a source and a destination address for each data word transferred, and to test and branch after each transfer. These operations require several extra clock cycles per data word. For a large number of data words, the generation of addresses and the testing and branching impose a considerable burden on the system, which in turn, slows the system down significantly. The use of a software routine is especially inefficient when data needs to be stored in the memory in a non-sequential fashion. In such a case, the CPU is precluded from using its sequential addressing mode to generate the addresses, which means that the CPU must instead calculate the addresses. Address calculation requires even more extra cycles, which in turn, slows down the data transfer process even more. Thus, even though a software routine properly effects the transfer of data, it does so in an undesirably slow manner.

As an alternative, the direct memory access (DMA) mechanism has been used. In the DMA scheme, when the data source has a large block of data to transfer, the DMA hardware signals the CPU, and in response to this signal, the CPU relinquishes control of the system bus to the DMA hardware. Thereafter, the DMA hardware transfers the block of data directly from the data source to the memory without passing through the CPU. While DMA is faster than the software loop, DMA does have its disadvantages. One major disadvantage is that, in order to implement DMA, special hardware must be provided in each computing system in which a specific data source may be installed, and this hardware adds cost to the system. In the case where the computing system has already been sold, adding DMA hardware to the system may be practically infeasible. A second disadvantage of the DMA scheme is that it requires the CPU to relinquish control of the system bus while data transfer is taking place. This means that during data transfer, the CPU cannot service interrupts or perform any substantive processing. In effect, the CPU is rendered practically useless during that time. If data transfer takes up a significant percentage of the system run time, the CPU will be rendered ineffective for an inordinate amount of time. For many systems, such an implementation is impracticable. For the reasons discussed above, neither prior art data transfer mechanism provides satisfactory results.

SUMMARY OF THE INVENTION

The present invention provides an improved method and apparatus which transfers data faster than a conventional software loop but which does not suffer from the drawbacks of DMA. In accordance with the method of the present invention, data transfer is effected by first monitoring control and address signals from the CPU to determine whether data transfer between the data source and the memory is desired. If data transfer is desired, then an optimized instruction set is generated for each of the data words to be transferred from the data source to the memory. Preferably, each optimized instruction set is generated by receiving from the data source the data to be transferred and a destination address, and by merging the data and the address with an instruction for causing the CPU to move data into a destination address of the memory. Thereafter, each instruction set is sent to the CPU for execution thereby to transfer the data from the data source to the memory. Because the data and destination address are hard coded into each instruction set, the need for the CPU to fetch the data and to generate the destination address is obviated. Also, because a loop is not used, no testing and branching operation needs to be performed. Hence, data transfer is achieved in fewer CPU clock cycles than with the traditional software loop. This improved speed performance is attained without having to force the CPU to relinquish control of the system bus. Since it is the CPU which actually effects the data transfer, the CPU need not and cannot be arbitrated off the bus during data transfer. This means that the CPU remains free to service interrupts even during data transfer. Thus, the method of the present invention improves data transfer rate without incurring the drawbacks of DMA.

An apparatus for carrying out the method of the present invention comprises a determiner, an instruction generator, and a coupling circuit. The determiner, which preferably takes the form of a decoder, receives control and address signals from the CPU and decodes these signals to determine whether data transfer is desired. If data transfer is desired, the decoder generates a run control signal; otherwise, an idle control signal is generated. If data transfer is desired, the instruction generator generates an optimized instruction set for each data word to be transferred. The instruction generator preferably comprises a register having a plurality of storage sections, and an output. In one of the storage sections is stored an instruction for causing the CPU to move data into a destination address in the memory, and in a plurality of additional storage sections are stored the data to be transferred and the destination address in the memory to which the data is to be transferred. The data and destination address are received from the data source. Together, the contents of the register make up the optimized instruction set. The coupling circuit is coupled to the output of the generator to receive the optimized instruction set and, in response to the run control signal, the coupling circuit sends the instruction set to the CPU for execution thereby to effect the transfer of data from the data source to the memory.

DETAILED DESCRIPTION OF THE PREFERRED EMBODIMENTS

Figure 1:
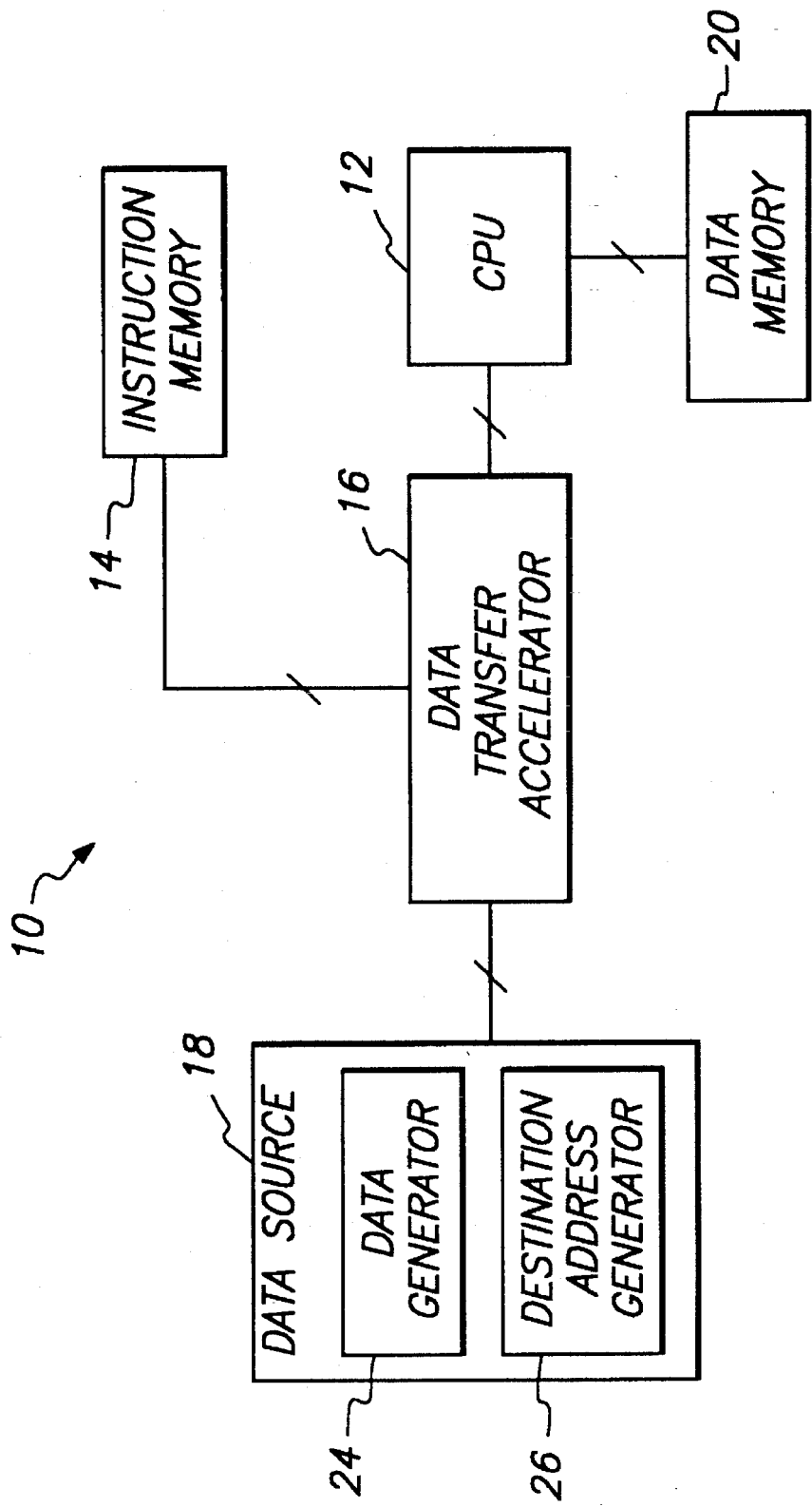
FIG. 1 is a block diagram of a computing system in which the apparatus 16 of the present invention may be implemented.

Before proceeding with a detailed description of the present invention, a brief discussion of the theory underlying the invention will be provided to facilitate a complete understanding of the invention. As previously mentioned, a traditional method for transferring data from a data source to a data memory involves the use of a software loop. The software loop is executed by a CPU to move data, a word at a time, from the data source, through the CPU, to the memory. An example of such a loop, written in assembly code for the Motorola 68000 microprocessor, is shown below:

Loop: MOVE.L (A0), (A1)+; move data word from data source to memory

DBRA D0, Loop; decrement, test, and branch.

For the sake of illustration, all computer code provided herein will be written in assembly code for the 68000 microprocessor. The transfer loop shown above is an example of a general transfer loop because the same general instruction is used to move each data word. Such a general instruction requires that the CPU generate a source address for each data word, retrieve the data word, and generate a destination address for the data word in order to transfer the data. The CPU must also test and branch after transferring the data word. These operations require several extra CPU clock cycles. For the general loop shown above, thirty CPU clock cycles are required to move four bytes of data.

It is generally known in the programming art that "in-line" code requires fewer clock cycles to execute than general code. In-line computer code is a set of instructions which has incorporated therein the data to be transferred and the destination address in the memory to which the data is to be moved. An example of a set of in-line code for moving four bytes of data is given below:

MOVE.L#<data>, (xxx).W

Upper word of data

Lower word of data

Destination address.

Due to the fact that the data and the destination address are already hard-coded into the in-line code, there is no need for the CPU to retrieve the data or to generate the destination address. Also, since no loop is used, the test and branch instruction is eliminated. Thus, the data is moved in fewer clock cycles. Using the in-line code given above, four bytes of data are moved in twenty-four clock cycles instead of thirty, which represents a 20% improvement in efficiency.

While in-line code is much more efficient than general code, in-line code is not typically used to transfer data because a programmer generally lacks the information necessary to write in-line code. To elaborate, a programmer generally does not know what actual data will be transferred since this data is being generated by the data source on the fly. Also, the programmer normally does not know the destination address for the data since the destination address is affected by the length of the data and the starting address.

In light of these limitations, a software engineer has no choice but to write general code for effecting data transfer.

However, while the software engineer may not have access to the information needed to construct in-line code, the data source does. The data source has access to the data to be transferred because it is actually generating the data. Furthermore, the data source can generate the destination address for the data because it is the data source which defines the format in which the data is to be stored in the memory. Thus, the data source can provide all of the information necessary to construct in-line code. The present invention provides a method and apparatus for receiving this information from the data source, and utilizing the information to generate a set of in-line code which is executed by the CPU to move data from the data source to the memory more efficiently.

With reference to FIG. 1, there is shown a computing system 10 in which the apparatus 16 of the present invention may be implemented. The system 10 first comprises a CPU 12 for controlling the overall function of the system 10. For illustrative purposes, CPU 12 will be assumed herein to be a Motorola 68000 microprocessor, but it should be stressed that CPU 12 may be any of a number of commercially available microprocessors. Data memory 20, which is used to store data as the data is being processed, is coupled to CPU 12. It is data memory 20 which receives the data transferred from the data source 18. Also coupled to CPU 12 is the data transfer accelerator 16 of the present invention. Accelerator 16 receives data and address information from data source 18 and uses this information to generate an optimized instruction set. After generating the optimized instruction set, accelerator 16 sends the instruction set to CPU 12 to allow the CPU 12 to execute the instructions to transfer data to the data memory 20.

The instruction memory 14, which contains instructions executable by CPU 12, is coupled to accelerator 16. When accelerator 16 is not sending optimized instruction sets to CPU 12, it is the instructions stored within instruction memory 14 which are executed by CPU 12. Also coupled to accelerator 16 is the data source 18. Data source 18 preferably comprises a data generator 24 for generating the data to be transferred to data memory 20, and a destination address generator 26 for providing a destination address in data memory 20 to which the data is to be transferred. Data source 18 may be a number of different devices such as a graphics card or a game cartridge. The system 10 of FIG. 1 differs from a typical computing system in that accelerator 16 is disposed between data source 18 and CPU 12, and between instruction memory 14 and CPU 12. Such a configuration allows the accelerator 16 to generate optimized instruction sets using information from data source 18, and to selectively feed these optimized instructions to the CPU 12 for execution thereby.

Figure 2:
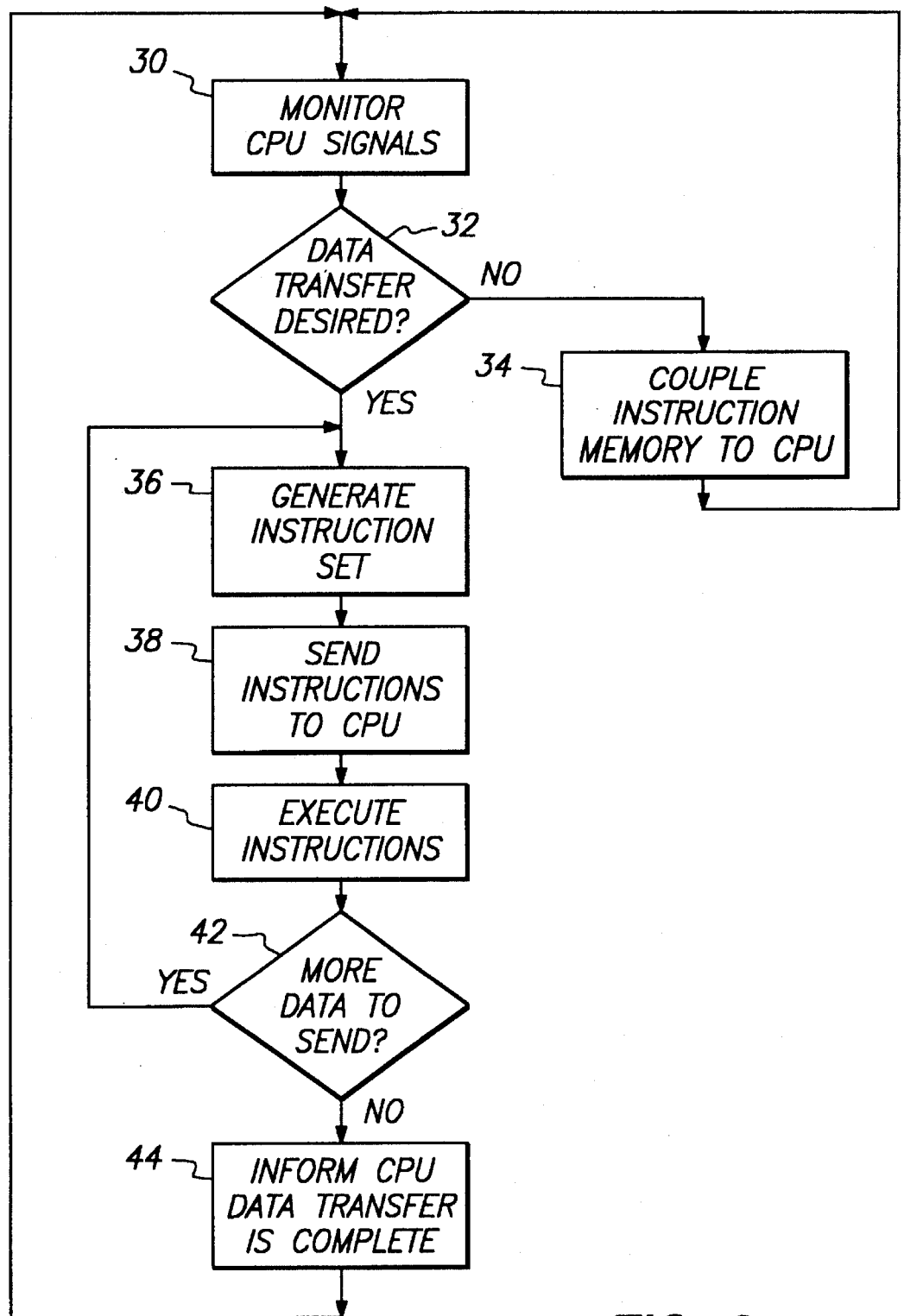
FIG. 2 is a flow diagram of the method of the present invention.

With reference to the flow diagram provided in FIG. 2, the method of the present invention, carried out by accelerator 16, will now be described. Accelerator 16 begins operation by monitoring 30 control and address signals from CPU 12 to determine 32 whether data transfer from data source 18 is desired. In normal operation, CPU 12 sends out control and address signals to access the data and instructions stored within memories 14 and 20. In order to differentiate attempts to access memories 14, 20 from attempts to transfer data, system 10 is preferably set up such that an arbitrary predetermined address region (an overlay region) is reserved for the data source 18. Any attempt to access an address in this overlay region will signal to accelerator 16 that data transfer may be desired. In addition to sending an address within the overlay region, CPU 12 preferably also sends an enable control signal to confirm that data transfer is indeed desired. This enable control signal allows the accelerator 16 to differentiate between an attempt to access an address in the overlay region in one of the memories 14, 20, and an attempt to transfer data from data source 18. To determine 32 whether data transfer is desired, accelerator 16 preferably decodes the address and the enable signal received from CPU 12, and only if the enable signal is asserted and the address is within the overlay region will it be determined that data transfer is desired.

If data transfer is not desired, accelerator 16 simply couples 34 CPU 12 to instruction memory 14 to allow memory 14 to be accessed. If, on the other hand, data transfer is desired, accelerator 16 generates 36 an optimized instruction set for each data word to be transferred. Each optimized instruction set is preferably generated by first providing an instruction which is executable by CPU 12 for moving a data word from data source 18 to memory 20. Then, accelerator 16 receives the data to be transferred from data generator 24, and the destination address from destination address generator 26, and merges these two pieces of information with the move instruction to derive a set of in-line code, i.e. an optimized instruction set. In most instances, the data source 18 generates the data and the destination address before they are requested by the CPU 12. Hence, it is possible for accelerator 16 to pregenerate the optimized instruction set and to store it within an internal memory to await the request by CPU 12. Such an implementation requires an internal memory, however, which adds cost and complexity to the accelerator. More preferably, the optimized instruction set is generated as it is needed, that is, in real time.

After the instruction set is generated, accelerator 16 sends 38 the instruction set to the CPU 12. Before sending the instruction set, however, accelerator 16 checks the enable and the address signals from the CPU 12 to determine whether the address is still within the overlay region and whether the enable signal is still asserted. It is possible that, during the generation of the instruction set, the CPU 12 received an interrupt request and is now servicing that request. If so, accelerator 16 should not send the instruction set until CPU 12 has finished servicing the interrupt. Thus, the optimized instruction set is sent only if the enable and address signals have the proper values.

After the optimized instruction set is sent, the instruction set is executed 40 by CPU 12 to transfer a data word into a destination address in data memory 20. Since the optimized instruction set contains within it the data and the destination address, the need for the CPU 12 to fetch the data and to generate the destination address is obviated. And since no loop is used, no test and branch operations need be performed. Hence, the data is transferred in a minimum number of clock cycles. After the instruction set is executed, accelerator 16 determines 42 whether the data source 18 has more data words to transfer. If so, steps 36-42 are repeated to generate another optimized instruction set to move another data word. Otherwise, accelerator 16 sends 44 an instruction to the CPU 12 to inform the CPU 12 that data transfer is complete. Thereafter, accelerator 16 loops back to step 30 to monitor the address and enable signals for another data transfer request.

Figure 3:
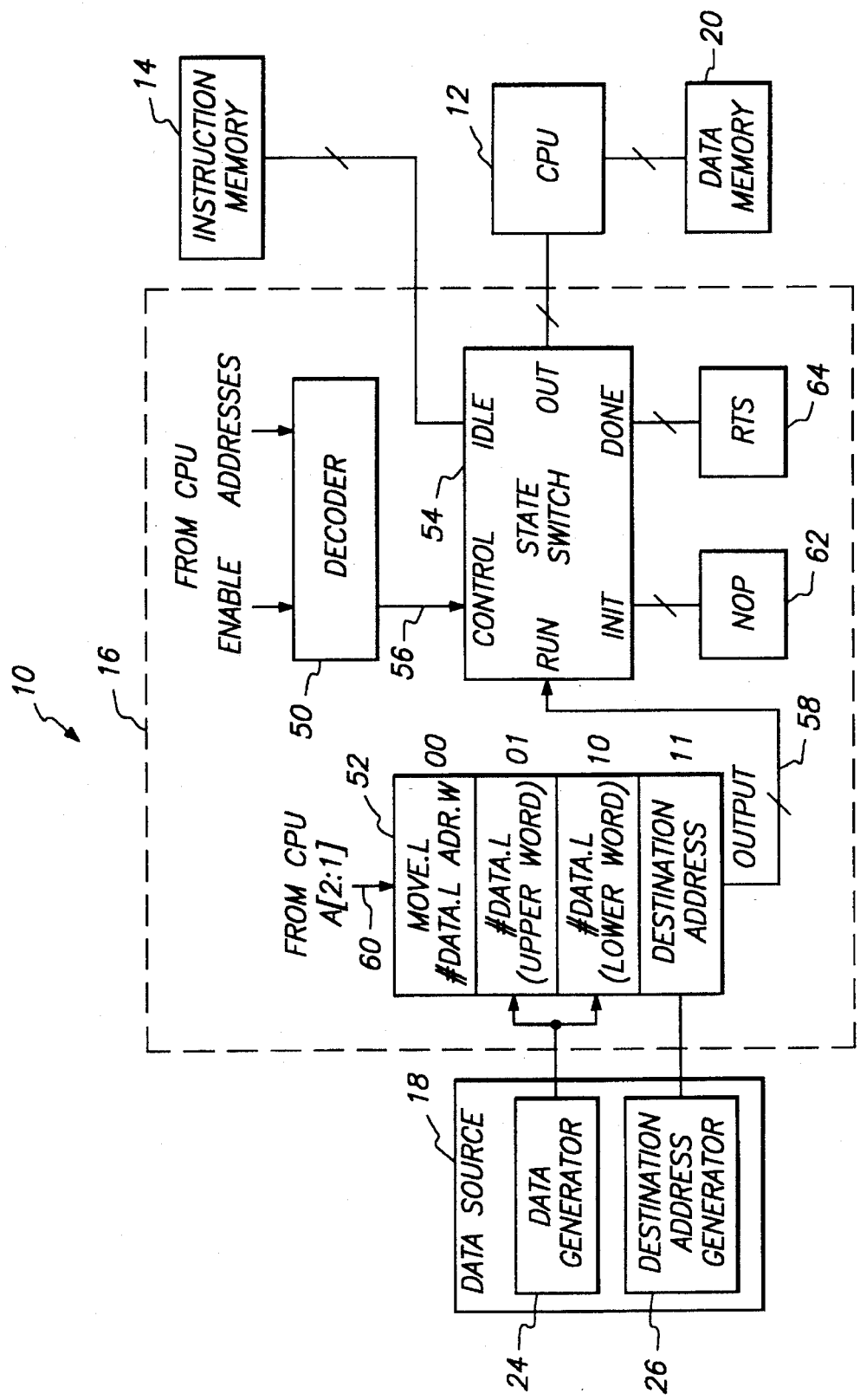
FIG. 3 is a more detailed block diagram of the system of FIG. 1 to more clearly illustrate the various elements of the apparatus 16 of the present invention.

With reference to FIG. 3, the accelerator 16 of the present invention will now be described in greater detail. As shown in FIG. 3, accelerator 16 preferably comprises a determiner 50, an instruction generator 52, and a coupling circuit 54. The determiner 50, which preferably takes the form of a decoder 50, receives an enable control signal and address signals from the CPU 12. Decoder 50 decodes the address signals to determine whether the address falls within the overlay region, and tests the enable signal to determine whether it is asserted. If the address is within the overlay region and the enable signal is asserted, then decoder 50 generates a run control signal on its output line 56 to indicate that data transfer is desired. Otherwise, decoder 50 generates an idle control signal on line 56.

The instruction generator 52 responsible for generating the optimized instruction set preferably takes the form of a scratch pad register 52 having four storage sections. In storage section 00, there is stored a MOVE.L instruction, which is a Motorola 68000 microprocessor instruction for transferring a long data word (four bytes) to a specified destination address. In storage locations 01, 10, and 11 are stored the data to be transferred and the destination address, respectively. Register 52 receives the data from the data generator 24 and the destination address from the address generator 26 of the data source 18. Together, the information in storage sections 00, 01, 10, 11 form a single optimized instruction set. Since the MOVE.L instruction is perpetually stored within section 00, register 52 generates an optimized instruction set by simply storing within section 01, 10, and 11 the data and the destination address received from the data source 18. To output the optimized instruction set, each storage section is preferably sequentially accessed to cause the contents of the accessed section to be transmitted on output lines 58.

The accessing of the storage sections 00, 01, 10, 11 is controlled by the input select signals received on input lines 60. For synchronization purposes, the input select signals are preferably address bits A[2:1] from the CPU 12. To elaborate, in order for the instructions from register 52 to be executed properly by CPU 12, it is important that the output of instructions from register 52 be synchronized with the operational cycles of the CPU 12. This is best achieved by monitoring the current state of the CPU 12. It has been found that synchronization and proper accessing are best attained by monitoring the address bits A[2:1]. Hence, bits A[2:1] are preferably used as the input select signals.

Accelerator 16 further comprises a coupling circuit 54 for selectively sending the generated instruction set to CPU 12 to accelerate data transfer. Coupling circuit 54 preferably takes the form of a state switch 54 having a control input port CONTROL, a plurality of other input ports RUN, IDLE, INIT, DONE, and an output port OUT. Switch 54 serves to couple one of the input ports to the output port based on the status of the control signal on line 56 and the state of the switch 54. State switch 54 may be implemented in a variety of ways but in the preferred embodiment, switch 54 is implemented using combinational logic. The control input port CONTROL is coupled to line 56 to receive the output control signal from decoder 50. This control signal provides state switch 54 with an indication of whether data transfer is desired. Coupled to the output lines 58 of register 52 is the RUN port. RUN port serves to receive the various lines of the generated instruction set to send on to the CPU 12. The IDLE port is coupled to the instruction memory 14, which contains instructions executable by the CPU 12. The INIT port is coupled to an NOP register 62 and the DONE port is coupled to an RTS register 64. The NOP register 62 contains an NOP (no operation) instruction for causing the CPU 12 to wait and do nothing, and the RTS register 64 contains an RTS (return from subroutine) instruction for causing the CPU 12 to execute a return from subroutine.

Figure 4:
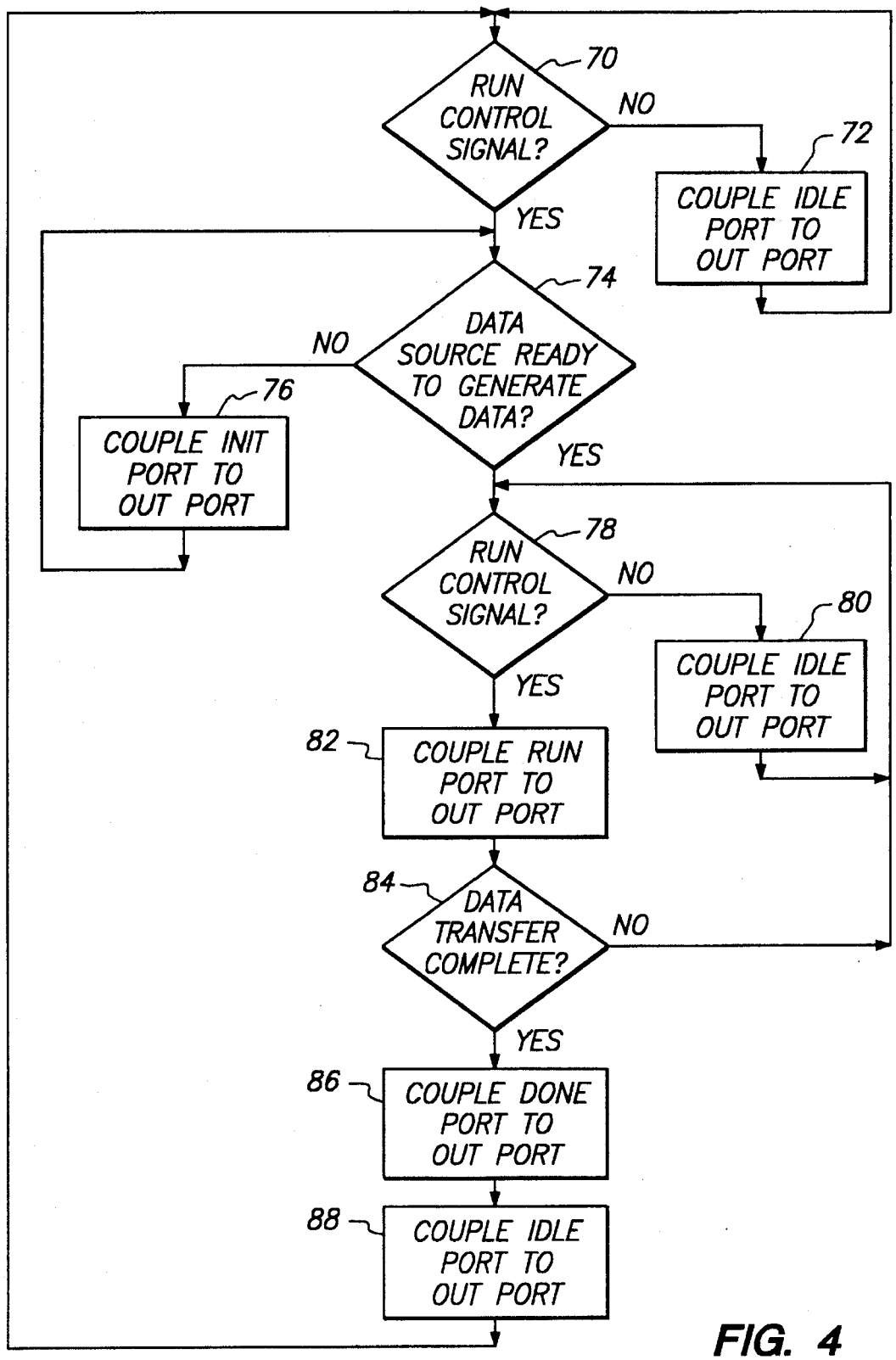
FIG. 4 is a flow diagram illustrating the sequence of operation of the state switch 54.

To further describe the state switch 54, reference is made to FIG. 4, wherein a flow diagram is provided to illustrate the operational sequence of switch 54. Switch 54 operates by first checking 70 the CONTROL port for a run control signal from decoder 50. If a run control signal is not present, but instead, an idle control signal is present, then it means that data transfer is not desired. Thus, switch 54 couples 72 the IDLE port to the OUT port to allow CPU 12 to access instruction memory 14. If a run control signal is present, switch 54 determines 74 whether data source 18 is ready to generate data. If not, the INIT port is coupled 76 to the OUT port to send an NOP instruction to the CPU 12, which causes the CPU 12 to simply wait. Step 76 is repeated until the data source 18 is ready.

Thereafter, switch 54 again checks 78 for a run control signal at the CONTROL port. It is possible that, between steps 70 and 78, the CPU 12 was called upon to service an interrupt. If so, switch 54 couples 80 the IDLE port to the OUT port so that no instructions from register 52 are sent to CPU 12 during the interrupt servicing period. When the CPU 12 returns from servicing the interrupt, the run control signal will again appear at the CONTROL port. In response, switch 54 couples 82 the RUN port to the OUT port to now send the optimized instruction set from register 52 to CPU 12. Thereafter, switch 54 determines 84 whether data transfer is complete. If not, switch 54 loops back to step 78 to send more instructions to the CPU 12. However, if data transfer is complete, switch 54 couples 86 the DONE port to the OUT port to send an RTS instruction to the CPU 12 to inform the CPU 12 that data transfer is complete. After the RTS instruction is sent out, switch 54 again couples 88 the IDLE port to the OUT port and loops back to step 70 to check for another run control signal.

Referring again to FIG. 3, the operation of the overall system 10 will now be described. In normal operation, CPU 12 generates address signals which are outside the overlay region. Hence, the IDLE port is usually coupled to the OUT port to allow the CPU 12 to access the instructions stored within memory 14. When data transfer is desired, however, CPU 12 executes the following instruction:

JSR Start_Address; jump to subroutine at the start address;

where the Start_Address is an address within the overlay region. The JSR instruction is a standard instruction used for branching to a subroutine. Thus, CPU 12 treats a data transfer encounter with the data source 18 as a call to a subroutine. Preferably, execution of the JSR instruction generates an enable control signal. This enable control signal, along with the Start_Address, is received by decoder 50. Because the enable signal is asserted and because the Start_Address is within the overlay region, decoder generates a run control signal on line 56, indicating that data transfer is desired. In response, switch 54 checks the data source 18 to determine whether data source 18 is ready to generate data. If not, switch 54 couples the INIT port to the OUT port to send a series of NOP instructions to the CPU 12. These instructions cause the CPU 12 to wait. When data source 18 is ready to generate data, register 52 receives the data and the destination address from the data source 18, and stores this information in sections 01, 10, and 11 to provide a complete optimized instruction set which is ready to be sent.

Before sending the instruction set to CPU 12, however, switch 54 checks the CONTROL port for a run control signal. If the run control signal is not present, then it probably means that the CPU 12 is currently servicing an interrupt. In such a case, switch 54 couples the IDLE port to the OUT port and waits until CPU 12 is finished servicing the interrupt. When CPU 12 returns from the interrupt, a run control signal will again appear on the CONTROL port and, in response, switch 54 couples the RUN port to the OUT port to send the optimized instruction set to CPU 12. The instruction set is preferably sent to the CPU 12 by sequentially outputting the contents of each of the storage sections onto output lines 58. As mentioned previously, the accessing of the storage sections of register 52 is controlled by the address bits A[2:1]. Thus, to sequentially access each of the storage sections, CPU 12 preferably sends a series of addresses which fall within the overlay region and which have the address bits A[2:1] cycling from 00 to 11.

As each line of the instruction set is sent, each line is executed by CPU 12 and, when all lines of the optimized instruction set have been executed, a data word is transferred into a destination address in memory 20. Thus, data transfer is achieved. Thereafter, switch 54 determines whether more data words need to be moved from data source 18 to memory 20. If so, another instruction set is generated and sent to CPU 12 to transfer another data word. This process is repeated until all data words have been transferred. When data transfer is complete, switch 54 couples the DONE port to the OUT port to send an RTS instruction to the CPU 12. The RTS instruction is a general return instruction which is executed at the end of each subroutine call. By sending this instruction to CPU 12, accelerator 16 is causing the CPU 12 to end the subroutine call and to resume executing its regular program instructions. To allow this to take place, switch 54 couples the IDLE port to the OUT port to once again couple the CPU 12 to the instruction memory 14.

Figure 5:
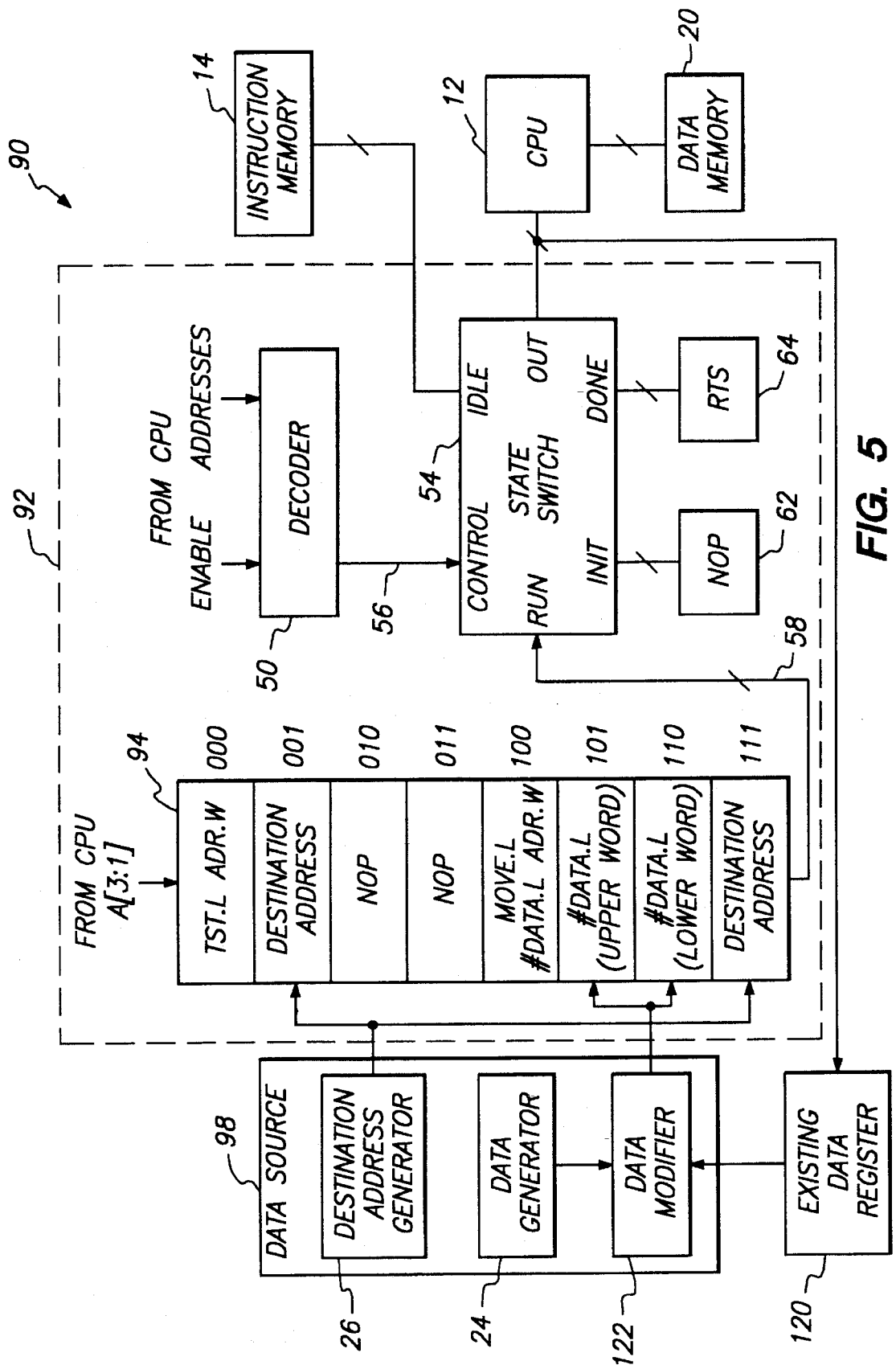
FIG. 5 is a block diagram of a computing system in which an alternative embodiment of the apparatus of the present invention may be implemented.

As thus far described, accelerator 16 achieves data transfer by writing over data already existing in the memory 20. There may be instances, however, in which it is desirable not to write over the data, but instead to merge the data from the data source 18 with data already in the memory 20. If the merging of data is desired, then an alternative embodiment of the apparatus of the present invention may be used. Referring to FIG. 5, there is a shown a system 90 in which this alternative embodiment 92 may be implemented. System 90 is substantially similar to system 10 and to indicate this similarity, identical elements in systems 10 and 90 are labeled with identical numbers. System 90 differs from system 10 in four respects: (1) the instruction generating register 94 of system 90 has eight storage sections instead of four; (2) register 94 receives address bits A[3:1] instead of A[2:1] as input select signals; (3) system 90 further comprises an existing data register 120 coupled to CPU 12; and (4) the data source 98 of system 90 further comprises a data modifier 122 coupled to both the data generator 24 and register 120. The two systems are identical in all other respects.

Since accelerator 92 is designed to merge two data words instead of overwriting one data word with another, the optimized instruction set generated by accelerator 92 needs to have several additional instructions incorporated therein. Thus, register 94 has eight storage sections instead of four. Register 94 preferably has stored within section 000 a TST.L Adr. W instruction followed by a destination address stored within section 001. The destination address is received from generator 26 in data source 98. These two instruction lines, when executed by CPU 12, cause the CPU 12 to read the data word currently stored within data memory 20 at the specified destination address, and to write this data to the existing data register 120. Thereafter, data modifier 122 merges this existing data with data from the data generator 24 to produce a set of modified data.

The following two storage sections 010, 011 of register 94 preferably store two successive NOP instructions. These NOP instructions serve to pad the instruction stream so that the TST.L and the MOVE.L instructions fall on address 00 boundaries. In the next storage section 100, there is stored a MOVE.L instruction for transferring a data word to a destination address in memory 20. This is the same instruction as that used in system 10 for transferring data. However, note that storage locations 101 and 110 receive the modified data from data modifier 122 instead of the data from generator 24. This means that the data being transferred by the MOVE.L instruction is the merged data. Hence, accelerator 92 overwrites the existing data with data which represents the product of the merging of the existing data with the data from the data generator 24. Storage section 111 contains the destination address in memory 20 to which this merged data is to be written.

As with register 52 of accelerator 16 (FIG. 3), it is important that the output of the instruction lines from register 94 be synchronized with the operational cycles of CPU 12. This is best achieved by monitoring the current state of the address bits A[3:1]. Hence, address bits A[3:1] are used as the input select signals for accessing the storage sections of register 94.

The operation of system 90 is quite similar to that for system 10. The decoder 50 determines whether data transfer is desired and, if so, decoder 50 generates a run control signal. In response to a determination that data transfer is desired, an optimized instruction set is generated by the generation register 94. State switch 54 receives the output from register 94 and selectively couples the RUN port to the OUT port to send the instructions to CPU 12 to effect data transfer. Because system 90 functions in much the same manner as system 10, the operation of system 90 will not be described in detail in order to avoid repetition.

Thus far, the apparatus of the present invention has been described as being separate from the data source, but it should be noted that the invention may be incorporated into the data source to form a single apparatus. Such an implementation is probably preferred if the data source is a game cartridge.

What is claimed is:

1. An apparatus for accelerating the transfer of data from a data source to a memory coupled to a central processing unit (CPU), comprising:

a determiner for receiving and processing signals from said CPU to determine whether data transfer from said data source to said memory is desired, said determiner generating a run control signal in response to a determination that data transfer is desired, an instruction generator, having an output for generating an optimized instruction set for execution by said CPU for effecting data transfer from said data source to said memory, and at least one input for receiving said data from said data source and a destination address from said data source to provide at the output an optimized instruction set comprising:
   said data from said data source;
   said destination address; and
   a portion of an instruction signifying a transfer of data; and a coupling circuit coupled to the output of said instruction generator responsive to said run control signal to send said optimized instruction set to said CPU to enable said CPU to execute said instructions to transfer data from said data source to said memory.

2. The apparatus of claim 1, wherein said instruction generator comprises a register having a first storage section for storing an instruction for causing said CPU to transfer data to a destination address in said memory, and a plurality of additional storage sections, said register receiving data and said destination address from said data source and storing said data and destination address into said additional storage sections.

3. The apparatus of claim 2, wherein said register receives address signals from said CPU and responds by selectively outputting said contents of each of said storage sections to said coupling circuit.

4. The apparatus of claim 1, wherein said determiner generates an idle control signal in response to a determination that data transfer is not desired, and wherein said coupling circuit responds to said idle control signal by terminating said sending of said optimized instruction set to said CPU.

5. The apparatus of claim 4, wherein said coupling circuit comprises:

a state switch having an idle port coupled to an instruction memory, and an output port coupled to said CPU, said state switch coupling said idle port to said output port in response to said idle control signal.

6. The apparatus of claim 1, wherein said coupling circuit comprises:

a state switch having a run port coupled to said output of said instruction generator, and an output port coupled to said CPU, said state switch coupling said run port to said output port in response to said run control signal to send said optimized instruction set to said CPU for execution thereby.

7. The apparatus of claim 6, wherein said state switch has a done port, and wherein said apparatus further comprises an RTS register coupled to said done port for storing an instruction for causing said CPU to terminate said transfer of data into said memory, said state switch coupling said done port to said output port when said transfer of data from said data source to said memory is complete.

8. The apparatus of claim 1, wherein said instruction generator generates said optimized instruction set substantially immediately prior to execution by said CPU.

9. The apparatus of claim 1, wherein said determiner comprises:

a decoder for receiving address signals from said CPU and decoding said address signals to determine whether said address is within a selected range, said decoder generating said run control signal in response to a determination that said address is within said selected range.

10. A method for accelerating the transfer of data from a data source to a memory coupled to a central processing unit (CPU), comprising the steps of:

monitoring signals from said CPU to determine whether data transfer from said data source to said memory is desired, providing a portion of an instruction for causing said CPU to move data from said instruction to a destination address in said memory;

receiving said data from said data source and said destination address from said data source; and merging said data from said data source and said destination address from said data source with said instruction portion to generate an optimized instruction set; and sending said optimized instruction set to said CPU in response to a determination that data transfer is desired.

11. The method of claim 10, further comprising the step of:

executing said optimized instruction set to optimally transfer data from said data source to said memory.

12. The method of claim 11, wherein said optimized instruction set is generated substantially immediately prior to said execution of said optimized instruction set.

13. The method of claim 10, wherein the step of monitoring comprises the steps of:

receiving control and address signals from said CPU; and processing said signals to determine whether data transfer from said data source to said memory is desired.

14. The method of claim 13, wherein the step of processing includes the step of:

decoding said address signals to determine whether said address is within a selected range.

15. The method of claim 10, wherein the step of sending comprises the steps of:

receiving address signals from said CPU;

decoding said address signals to determine whether said address is within a selected range; and sending said optimized instruction set only if said address is within said selected range.

* * * * *